United States Patent [19]

Rebhan et al.

[11] Patent Number: 5,111,473
[45] Date of Patent: May 5, 1992

[54] LASER GAS PURIFYING APPARATUS

[75] Inventors: Ulrich Rebhan, Göttingen; Gerd Steinführer, Bovenden; Frank Voss; Peter Oesterlin, both of Göttingen, all of Fed. Rep. of Germany

[73] Assignee: Lambda Physik Forschungs- und Entwicklungsgesellschaft mbH, Göttingen, Fed. Rep. of Germany

[21] Appl. No.: 644,210

[22] Filed: Jan. 22, 1991

[30] Foreign Application Priority Data

Jan. 25, 1990 [DE] Fed. Rep. of Germany ....... 4002185

[51] Int. Cl.$^5$ ................................................ H01S 3/22
[52] U.S. Cl. ...................................................... 372/59
[58] Field of Search ........................................... 372/59

[56] References Cited

U.S. PATENT DOCUMENTS

| | | | |
|---|---|---|---|
| 3,810,043 | 5/1974 | Locke et al. | 372/59 |
| 4,674,098 | 6/1987 | Turner | 372/59 |
| 4,674,099 | 6/1987 | Turner | 372/59 |
| 4,723,254 | 2/1988 | Turner | 372/59 |
| 4,740,982 | 4/1988 | Hakuta et al. | 372/59 |
| 4,803,693 | 2/1989 | Schramm | 372/59 |
| 5,014,281 | 5/1991 | Hecht et al. | 372/59 |

FOREIGN PATENT DOCUMENTS 3632995 4/1987 Fed. Rep. of Germany .

OTHER PUBLICATIONS

Patent Abstracts of Japan —E—868 Jan. 8, 1990 vol. 14/No. 2-"Excimer Laser Apparatus" M. Wutz.
H. Adam & W. Walcher-"Theorie und Praxis der Vacuumtechnik"-1986 pp. 573-575 and 205-206.

Primary Examiner—Georgia Y. Epps
Attorney, Agent, or Firm—Brumbaugh, Graves, Donohue & Raymond

[57] ABSTRACT

In an apparatus for purifying laser gas, comprising a cooling circuit for cleaning of the laser gas, the cooling circuit is separable from the laser and operable by way of a shunt line, independently of the laser.

1 Claim, 1 Drawing Sheet

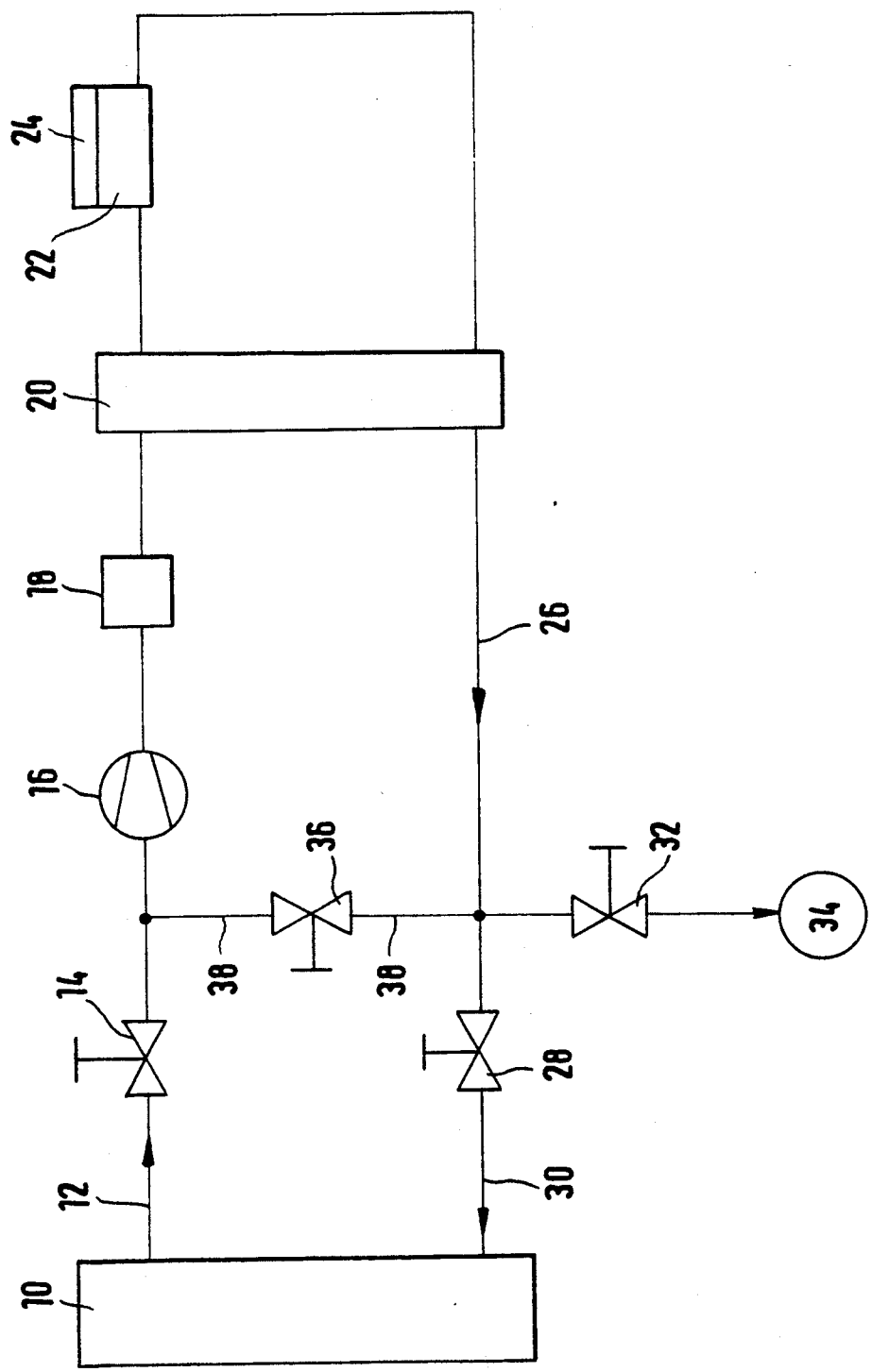

LASER GAS PURIFYING APPARATUS

FIELD OF THE INVENTION

The instant invention relates to an apparatus for purifying laser gas.

BACKGROUND OF THE INVENTION

Laser operation of gas lasers, in particular of excimer lasers or carbon-dioxide lasers leads to contamination of the laser gas. The laser gas is excited by gas discharge and that may involve the formation of contaminant gases and other contaminating substances by chemical reactions, wear of the laser electrodes, reactions at the walls, etc.

Laser performance is impaired by the contaminant gases and other contaminating substances. Especially for long term operation of the laser, it is essential that any contaminants be removed from the laser gas.

The prior art knows devices for purifying or cleaning laser gas. To accomplish that, laser gas is passed out of the resonant cavity, transferred into a cleaning means, and then recycled in purified state back into the resonator.

The known devices for purifying laser gas are not sufficiently effective when it comes to treating sensitive laser gases, such as $F_2$, ArF, and when pressures are as high as above 3.5 bars.

Known purifying equipment for laser gas eliminates gas contaminants by freezing them by means of a cooling trap. This technique is applied above all with excimer laser gases. If the laser is switched off, either briefly (e.g. for window exchange) or for a longer period of time (e.g. over night) the cooling circuit must be closed. A gas circulation pump usually provided in the cooling circuit is turned off so that it will not work against the closed valves. When the cooling circuit is closed, a heat exchanger is no longer active and, therefore, warms up. Now, if the laser is switched on again and the cooling circuit opened so that it will communicate with the laser, hot laser gas will be pumped into the cooling trap where it may cause the renewed release of contaminants that were frozen to the walls of the cooling trap before. In this manner the laser is contaminated. On the other hand, if the source of refrigeration of the cooling circuit is switched off for long- or short-term shutdown of the laser and the contaminants that are frozen to the walls of the cooling trap thaw and are removed from the cooling circuit by a vacuum pump, longer start-up times must be put up with when the laser is turned on again because the cooling trap and heat exchanger need time to reach their operating temperatures.

DE 36 32 995 A1 describes a method of purifying gases for rare gas halide excimer lasers, making use of a cooling trap. Yet the cooling trap is not "shortcircuited", in other words, with this prior art, each circuit containing the cooling trap passes also through the excimer laser.

It is known from the Patents Abstracts of Japan 1-251765 (A) to prolong the life span of a thyratron used with an excimer laser by operating a cooling trap of the thyratron even if the laser is not operative.

It is known in the general vacuum technology to shortcircuit pumping means in order to cut off temporarily a pump from a recipient (which is to be evacuated), cf. Wutz, Adam, Walcher "Theorie und Praxis der Vakuumtechnik", Vieweg-Verlag, Braunschweig, 1986, pages 573-575 and 205-206.

SUMMARY OF THE INVENTION

It is the object of the invention to provide an apparatus of simple structure for purifying laser gas which apparatus is to enable easy shutdown of the laser.

The object is met, in accordance with the invention, in that the cooling circuit provided for purifying the laser gas is separable from the laser and can be operated independently of the laser by means of a shunt line.

In accordance with the invention it is thus provided that the cooling circuit in which laser gas to be cleaned is circulating be separated from the laser when the laser is shut down and that it be "shortcircuited" by an additional shunt line provided for this purpose. This makes it possible to keep the cooling circuit operating separately of the laser and to maintain the refrigeration source and, where applicable, the heat exchanger at their respective operating temperatures. In other words, according to the invention two cooling circuits are adapted for selective switching. They each contain a source of refrigeration (cooling trap), and in one circuit configuration the discharge space of the laser is connected in the cooling circuit whereas it does not form part of the cooling circuit in the other case.

BRIEF DESCRIPTION OF THE DRAWING

An embodiment of the invention will be described in greater detail below with reference to the accompanying drawing, in which the only figure is a diagrammatic presentation of a cooling circuit for purifying laser gas.

DESCRIPTION OF THE PREFERRED EMBODIMENT

The discharge space (not shown) of a laser 10 (e.g. an excimer laser) is connected to the cooling circuit illustrated in the drawing. To begin with, during the normal operative condition of the laser, laser gas enters into a system of conduits in the direction of arrow 12. A valve 14 is open, and a pump 16 conveys the gas through a refrigerant reservoir 18 to a per se known heat exchanger 20. In the heat exchanger 20, hot "contaminated" laser gas coming from the laser 10 is precooled with laser gas that was previously cooled in a cooling trap 22. Therefore, it enters the cooling trap 22 at lower temperature. A source of refrigeration 24, such as a reservoir containing liquid nitrogen of a cryostat, helps set the temperature of the cooling trap 22 to such levels that contaminants in the laser gas become frozen at the walls of the cooling trap 22.

The resulting purified laser gas then is returned in the direction of arrow 26 through an open valve 28 and on in the direction of arrow 30 back into the laser 10.

When the laser 10 is shut down both valves 14 and 28 are closed and a valve 36 in a shunt line 38 is opened, thereby establishing a closed circuit consisting of line 38 and valve 36 plus the above mentioned structural elements 16, 18, 20, 22, and 26, in which circuit the pump 16 can work.

If the operation of the laser is to be interrupted only briefly the pump 16 can continue to function in the "shunt circuit" described so that the cooling trap 22 and the heat exchanger 20 will stay at operating temperature level (so-called stand-by mode).

Then, if operation of the laser is resumed, the valves 14 and 28 are opened while valve 36 is closed. Hot laser gas immediately is mixed with and precooled by the cold purified gas of the "shunt circuit" so that any contaminations condensed at the surfaces of the cooling trap 22 cannot be set free.

If the cold stored in the heat exchanger is not sufficient to avoid the undesired warming up of the cooling trap 22 when the laser is put into operation an additional refrigerant reservoir 18 is connected upstream, for example a copper block which has a high thermal capacity and large surface area.

On the other hand, if the laser has been shut down for a longer period of time (e.g. over night) and then is to be put into operation once more, the gas cleaning apparatus first is precooled in the stand-by operation explained above, before operation is resumed. To that end, valves 14 and 28 are closed and valve 36 is opened. In this manner the cleaning apparatus is ready to function at once upon switch-on of the laser (opening of valves 14 and 28 as well as closing of valve 36).

Also shown in the figure is a valve 32 which serves to connect the purifying circuit to a vacuum pump 34. The vacuum pump 34 evacuates the system following an opening thereof (e.g. for repair work) so that the required purity of the laser gas will be maintained. The vacuum pump 34 moreover may be utilized to remove any condensate from the cooling trap 22 at regular intervals.

What is claimed is:

1. Apparatus for purifying gas of an excimer laser wherein laser gas is passed out of the resonant cavity through an outlet port, transferred to gas-cleaning means, and returned to the resonant cavity through an inlet port, said apparatus comprising:

a first closed cycle system comprising a first conduit system coupled between the outlet and inlet ports of said laser including in the order named first valve means, pump means for conveying gas through said conduit system, a cooling trap and second valve means, said first and second valve means when open connecting said laser in said first conduit system for circulating laser gas from said outlet port, through said cooling trap and back to said inlet port, and when closed disconnect said first conduit system from said laser, and a second conduit system including third valve means connected to said first conduit system which when said third valve means is closed provides a second closed cycle system including said pump means and said cooling trap, but not said first and second valve means, for recirculating laser gas through said cooling trap independently of the laser.

* * * * *